A. P. VAN LEUVEN.
BICYCLE SADDLE.
APPLICATION FILED JUNE 10, 1918.

1,290,426.

Patented Jan. 7, 1919.
2 SHEETS—SHEET 1.

Inventor:
Aloysius Petrus van Leuven
by B. Singer
Attorney

A. P. VAN LEUVEN.
BICYCLE SADDLE.
APPLICATION FILED JUNE 10, 1918.

1,290,426.

Patented Jan. 7, 1919.
2 SHEETS—SHEET 2.

Inventor:
Aloysius Petrus van Leuven
by B. Singer
Attorney

UNITED STATES PATENT OFFICE.

ALOYSIUS PETRUS van LEUVEN, OF THE HAGUE, NETHERLANDS.

BICYCLE-SADDLE.

1,290,426. Specification of Letters Patent. Patented Jan. 7, 1919.

Application filed June 10, 1918. Serial No. 239,264.

*To all whom it may concern:*

Be it known that I, ALOYSIUS PETRUS VAN LEUVEN, of The Hague, Netherlands, have invented new and useful Improvements in Bicycle-Saddles, of which the following is a specification.

This invention relates to a bicycle saddle, of which the seat cushion in the middle is divided in two parts. Although the form of these saddles usually meets as well as possible the purpose of supporting only the ischiums, it has however appeared, that these saddles are not suitable for sensitive people.

The purpose of the invention is to eliminate this disadvantage by using air-cushions, which are easily accessible and removed viz; can be replaced by new ones. According to the invention each of the parts of the seat cushion consists of an air-cushion, which can be inflated and is arranged on a frame or another support and a cover for each, which is partly fastened to the support at the separation of both of the cushions and with the remaining of the edge engages in such a way the rim of the support, to which it is connected in an easily detachable manner, that the cover, when the cushion is not inflated can be removed and stretching itself around said rim of the support, when the cushions are inflated.

For the purpose of inflating the air-cushions, each cushion at the underside can be provided with an ordinary bicycle tire valve, which can be passed in an opening of the support and in which it can be fastened. By means of an ordinary bicycle pump the cushions then can be easily inflated, when the covers cover the air-cushions.

According to the invention, the fixing of the edge of the cover of each part of the cushion to the support can be obtained by arranging in this edge a steel wire of which the extremities and some interposed points by means of hooks or eyes or the like can be hooked to the frame or the support.

On the accompanying drawing the invention is further illustrated, and represents:

Figure 1 a top view.

Figure 1:
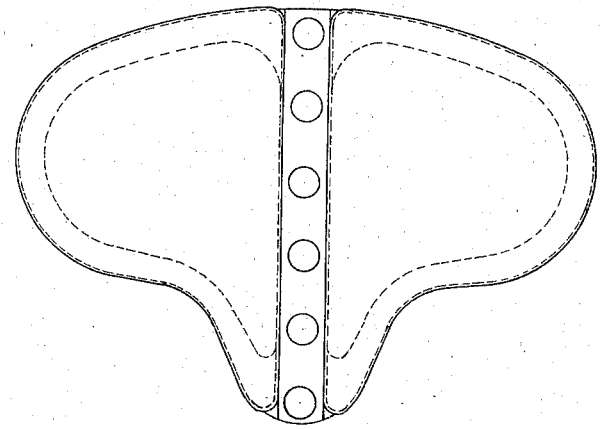
Figure 2:
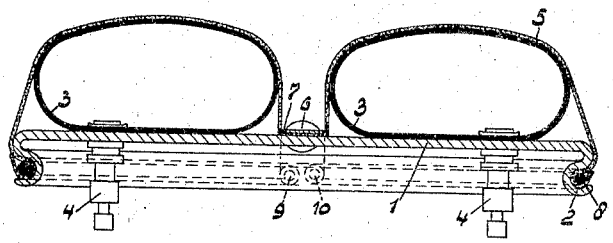
Figure 3:
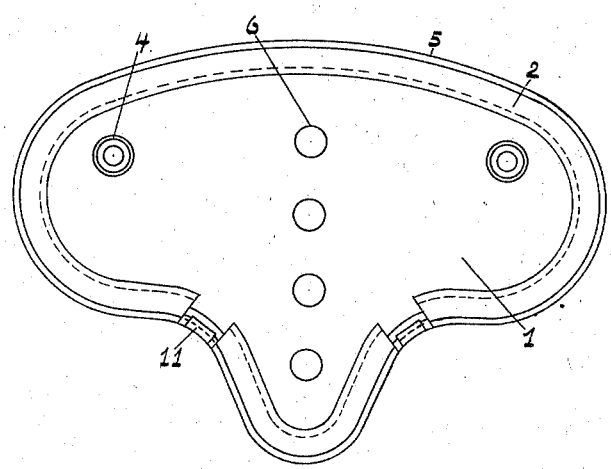

Fig. 2 a cross section,

Fig. 3 a view of the underside with the cover detached at the rim and

Figure 4:
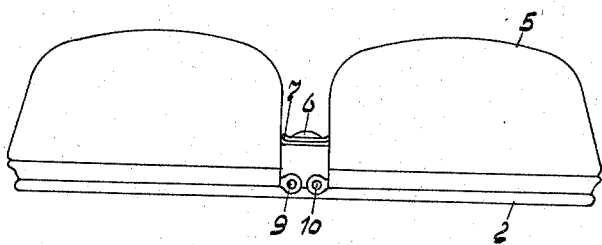

Fig. 4 a rear end view of a two part seat cushion with its support.

The frame of the saddle, which can be fixed in a suitable manner to the saddle pin or other appropriate part of the bicycle, is formed by the illustrated construction form of a flat metal plate 1, which is provided with a downwardly bent rim 2 forming an outwardly opening channel. On this plate 1 two air cushions 3 rest, which each are provided with a valve 4 as usually employed for pneumatic tires. Each of these valves is passed through a hole in the plate 1 and fastened herein in the usual way. Over both air cushions 3 a cover 5, made of one or two pieces, is arranged, which is fastened to the plate 1 at the part, situated between both cushions 3. This fastening is made by means of rivets, bolts, screws, or the like 6 by which the cover is clamped between the plate 1 and a metal strip 7. In this way for each air cushion 3 a cover is obtained. The free edge of each cover is seamed, in each seam a steel wire 8 being arranged. This steel wire at its ends is provided with eyes 9 one of which engages a small pin or hook 10, fixed to the part of the rim 2, situated at the rear side of the saddle, whereas the other eye in the same way engages a small pin at the front side of the saddle. This steel wire has such a length, that the seam of the cover, when the eyes are mounted around the small pins, fits exactly with some stretching in the channel of the rim 2 of the plate 1.

In order to retain the seam of the cover in the channeled rim 2 of the plate 1 the cover is securely hooked intermediate the ends of the wire 8. For this purpose a tongue 11 is punched out from the rim and bent outwardly. A portion of the cover seam is cut away to lay bare the steel wire 8 and to permit engagement thereof by the tongue 11.

It is obvious that it is quite suitable to use instead of metal, wood for the support and that the channel-shaped rim as well as the steel wire and the other parts for securing the cover heretofore do not constitute essential elements of the construction. The cover can, when the channel-shaped rim is omitted simply engage over the rim of the support and, be secured to the underside thereof in any suitable manner. Also the support need not be flat, but may be for instance concave corresponding to the form of the air cushions, or, with respects to the fixing to the frame of the bicycle the support may be provided with the necessary connecting parts. Further it is not necessary that the air cushions fit exactly to the shape of the space, formed between the cover and the support but parts of these spaces may be filled up in any other suitable manner.

Having thus fully described my invention, what I claim is:

1. A bicycle saddle, comprising a base plate having a flange, a plurality of air cushions arranged in spaced relation on said plate to form a central longitudinally extending gap, a cover for said cushions secured at the central portion to said plate in the gap between said cushions and detachably fastened with the outer edge to the flange of said plate, the outer edge of said cover being in stretched condition upon inflation of said cushions and in untensioned condition ready for removal upon deflation of said cushions.

2. A bicycle saddle, comprising a base plate, having a flange forming an outwardly opening channel, a plurality of air cushions arranged in spaced relation on said plate to form a central longitudinally extending gap, a cover for said air cushions, means arranged on said gap for securing the cover to said plate, and means for detachably fastening the outer edge of said cover in the channel of said flange.

3. A bicycle saddle, comprising a base plate, having a flange, an outwardly opening channel, a plurality of air cushions arranged in spaced relation on said plate to form a central longitudinally extending gap, a cover for said air cushion, said cover being provided with a seam, a flexible element disposed in said seam and means for detachably engaging said element at its ends and intermediate portions.

4. A bicycle saddle, comprising a base plate having a flange forming an outwardly opening channel, a plurality of air cushions arranged in spaced relation on said plate to form a central longitudinally extending gap, a cover for said air cushion, said cover being provided with a seam, a wire disposed in said seam having eyes at its ends and being laid bare at an intermediate portion, pins on said flange extending through said eyes, and a tongue stamped out from said flange and engaging the bare wire portion.

In testimony whereof I affix my signature in presence of two witnesses.

ALOYSIUS PETRUS VAN LEUVEN.

Witnesses:
W. B. WERMANDER,
J. VAN DER WEERD.

Copies of this patent may be obtained for five cents each, by addressing the "Commissioner of Patents, Washington, D. C."